US009860298B2

(12) United States Patent
Ghosh et al.

(10) Patent No.: US 9,860,298 B2
(45) Date of Patent: Jan. 2, 2018

(54) PROVIDING ACCESS VIA HYPERTEXT TRANSFER PROTOCOL (HTTP) REQUEST METHODS TO SERVICES IMPLEMENTED BY STATELESS OBJECTS

(71) Applicant: Oracle International Corporation, Redwood Shores, CA (US)

(72) Inventors: Rajesh Ghosh, Kalyani (IN); Vikas Soolapani, Calicut (IN); Rekha Ayothi, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 378 days.

(21) Appl. No.: 14/659,641

(22) Filed: Mar. 17, 2015

(65) Prior Publication Data

US 2016/0088056 A1 Mar. 24, 2016

Related U.S. Application Data

(60) Provisional application No. 62/054,401, filed on Sep. 24, 2014.

(51) Int. Cl.
*H04L 29/08* (2006.01)
*G06F 9/445* (2006.01)

(52) U.S. Cl.
CPC .............. *H04L 67/02* (2013.01); *H04L 67/16* (2013.01); *H04L 67/2842* (2013.01)

(58) Field of Classification Search
CPC ..... H04L 67/02; H04L 67/16; H04L 67/2842; H04L 5/0055; H04W 52/0216; Y02B 60/50
See application file for complete search history.

(56) References Cited

U.S. PATENT DOCUMENTS 8,275,855 B2 9/2012 Kothari et al.
8,745,718 B1 6/2014 Dufel et al.
(Continued)

OTHER PUBLICATIONS

Roy Thomas Fielding, Architectural Styles and the Design of Network-based Software Arch, 2000, pp. 1-180, Dissertation, Doctor of Philosophy in Information and Computer Science, University of California, Irvine.

(Continued)

*Primary Examiner* — Nicholas Taylor
*Assistant Examiner* — Afroza Sultana
(74) *Attorney, Agent, or Firm* — IPHorizons PLLC; Narendra Reddy Thappeta

(57) ABSTRACT

An aspect of the present disclosure provides access via HTTP verbs to services implemented by stateless objects. In one embodiment, the list of services implemented by a stateless object deployed on an application server is displayed to a user/administrator. Upon receiving (from the user/administrator) an input data indicating selection of some of the services (from the displayed list), only the selected service are provided access via a corresponding HTTP verb. In other words, a first service that is included in the selection is provided access via a HTTP verb, while a second service not included in the selection is not made accessible via HTTP verbs. Thus, a user/administrator is facilitated to provide access via HTTP verbs to only services of interest among those implemented by a stateless object at or after the deployment of the stateless object.

20 Claims, 12 Drawing Sheets

(56) References Cited

U.S. PATENT DOCUMENTS

| | | | |
|---|---|---|---|
| 2009/0235349 A1 | 9/2009 | Lai et al. | |
| 2011/0231443 A1* | 9/2011 | Hannel | H04L 63/105 707/776 |
| 2012/0151568 A1 | 6/2012 | Pieczul et al. | |
| 2013/0305326 A1* | 11/2013 | Potiagalov | H04L 69/08 726/5 |
| 2014/0068047 A1* | 3/2014 | Williams | H04L 41/5077 709/223 |
| 2014/0157228 A1 | 6/2014 | Pasternak | |

OTHER PUBLICATIONS

Belimpasakis P, Moloney S, Abstract, A platform for proving family oriented RESTful services hosted at home, Consumer Electronics, IEEE Transactions, ISSN :0098-3063, date May 2009, pp. 1-2, vol. 55 , Issue: 2, IEEE.

Lai C, Li Gong , Koved L, Nadalin A, Schemers R, Abstract, User authentication and authorization in the Java platform, Computer Security Applications Conference, 1999. (ACSAC '99) Proceedings. 15th Annual, ISSN : 1063-9527, Date of Conference:1999, Meeting Date : Dec. 6, 1999-Dec. 10, 1999, pp. 1-2, IEEE.

Securing the REST data service, http://pic.dhe.ibm.com/infocenter/wxsinfo/v7r1/index.jsp?topic=%2Fcom.ibm.websphere.extremescale.admin.doc%2Ftxsrestadminsec.html , downloaded circa july 31, 2014, pp. 1-4.

Marc Hadley, Web Application Description Language, date Aug. 31, 2009, pp. 1-21.

* cited by examiner

```
package acme.apps.per.sample.service;

import java.math.BigDecimal;
...
/**                                                              405
 * A sample class to demonstrate how serviceable APIs can be
 * developed using the ISG REST framework.
 * @rep:scope public
 * @rep:product PER
 * @rep:displayname HR Person Service
 * @rep:service Y
 * @rep:category IREP_CLASS_SUBTYPE JAVA_BEAN_SERVICES
 */
public class PersonResource {

 public PersonResource() {
  super();
 }

 /**                                                             410
   * This method returns a list of direct reports of the requesting user.
   * @return list of person records who are direct reports
   * @rep:paraminfo {@rep:innertype acme.sample.beans.PersonInfoBean}
   * @rep:scope public
   * @rep:displayname getDirectReports   <-- 414
   * @rep:httpverb get                   <-- 415
   * @rep:category BUSINESS_ENTITY sample
   */
 public List<PersonInfoBean> getDirectReports() throws
PerServiceException1 {
       ...
 }

 /**                                                             420
  * This api returns the person details for a specific person id.
  * Throws error if the person is not in requesting user's org hierarchy.
  * @return details of a person in the logged on user's org hierarchy.
  * @param personId person identifier                          <-- 421
  * @rep:paraminfo {@rep:required} {@rep:key_param}            <-- 422
  * @rep:scope public
  * @rep:displayname getPersonInfo   <-- 424
  * @rep:httpverb get                <-- 425
  * @rep:category BUSINESS_ENTITY sample
  */
 public PersonInfoBean getPersonInfo(int personId) throws
PerServiceException2 {
       ...
 }

 /**                                                             430
  * This api updates the person details for a specific person id.
  * @return details of a person in the logged on user's org hierarchy.
  * @param personInfo person info
  * @rep:paraminfo {@rep:required} {@rep:key_param}
  * @rep:scope public
  * @rep:displayname updatePersonInfo   <-- 434
  * @rep:httpverb post                  <-- 435
  * @rep:category BUSINESS_ENTITY sample
  */
 public PersonInfoBean updatePersonInfo(PersonInfoBean
personInfo) {
   ...
 }
...
} // End of PersonResource Class
```

| Display Name | Internal Name | Product | Type | Source | Status | Description |
|---|---|---|---|---|---|---|
| Advanced Scheduler REST API | acme.apps.cswebservice.server.SchedulerRestServicesImpl | Scheduler | Java | acme | Active | This API provides REST based services for the functionality of Advanced Scheduler |
| HR Person Service | acme.apps.per.sample.service.PersonResource | Human Resources | Java | acme | Active | A sample class to demonstrate how serviceable APIs can be developed using the ISG REST framework. |
| QAF REST | acme.apps.find.rep.ws.WFNotifiDerailsWrapper | Application Object Library | Java | acme | Active | Seeded POJP for getting rest services hosted on EBS instance |
| Rest Service Locator | acme.apps.find.rep.ws.service.EbsRestLocator | Application Object Library | Java | acme | Active | APIs to retrieve information about acme EBS REST based Web Services |

455

460

| Display Name | Internal Name | HTTP Verb | Scope | Status | Description |
|---|---|---|---|---|---|
| getAllReports | getAllReports | Get | Public | Active | This apl returns an array of all reports of the requesting user. |
| getDirectReports | getDirectReports | Get | Public | Active | This method returns a list of direct reports of the requesting user |
| getPersoninfo | getPersoninfo | Get | Public | Active | This apl returns the person details for a specific person id |
| updatePersoninfo | updatePersoninfo | Post | Public | Active | This api updates the person details for a specific person id |

```
    # +==========================================================================+
    # |    Copyright (c) 2005, 2013 acme and/or its affiliates.          |
    # |                        All rights reserved.                      |
    # |                          Version 12.0.0                          |
    # +==========================================================================+
    #
    # $Header: isgagent_properties_FMW.tmp 120.1.12020000.2 2013/09/19 04:51:23 mmanku ship $
    # ISG PROPERTIES FILE
    #

    ISG_SOA_EXTERNAL_URL=http://slc06uje.us.acme.com:8001
    ISG_SOA_INTERNAL_URL=http://slc06uje.us.acme.com:8001
    ISG_SOA_ADMIN_SERVER_URL=http://slc06uje.us.acme.com:7001
    ISG_SOA_ADMIN_USER=ASADMIN
    ISG_SOA_ACME_HOME=%s_soa_acme_home%
    ISG_AGENT_JNDI_NAMES=isgdemo
    isgdemo.ISG_RUNTIME_CONTEXT=AGENT
    isgdemo.ISG_TEMP_DIRECTORY_LOCATION=/u01/R122_EBS/fs_ne/inst/isgdemo_slc04qvi/soa/
471 isgdemo.ISG_EBS_EXTERNAL_URL=http://slc04qvi.us.acme.com:8000
    isgdemo.ISG_EBS_INTERNAL_URL=http://slc04qvi.us.acme.com:8000
    javax.xml.parsers.DocumentBuilderFactory=acme.xml.jaxp.JXDocumentBuilderFactory
    isgdemo.ISG_EBS_ADMIN_SERVER_URL=http://slc04qvi.us.acme.com:7001
473 isgdemo.ISG_GLOBAL_LOG=TRUE
474 isgdemo.ISG_LOGGER=FILE
477 isgdemo.ISG_MIN_REST_THREADS=5
478 isgdemo.ISG_MAX_REST_THREADS=20
479 isgdemo.ISG_REST_THREAD_EXEC_TIMEOUT=3000
```

*FIG. 4C*

Browser

| Integration Repository | Administration |

Search

Interface Name: [_____]   Internal Name: [_____]

Product Family: [All ▼]   Interface Type: [Java ▼] ← 515

Product: [All ▼]   Business Entity: [____🔍]

Hide More Search Options
TIP Select Category before a Category Value

Category: [Interface Subtype ▼]   Web Service Status: [All ▼]

Category Value: [Java Bean Services ▼]   Standard: [All ▼]

Interface Source: [All ▼]   Standard Specification: [____🔍]

Status: [All ▼]   Scope: [All ▼]

[Go]  [Clear All]

[Browse] 510

Export

| Name | Internal Name | Product | Type | Source | Status | Description |
|---|---|---|---|---|---|---|
| Advanced Scheduler REST API | acme.apps.cswebservice.server.SchedulerRestServicesImpl | Scheduler | Java | acme | Active | This API provides REST based services for the functionality of Advanced Scheduler |
| HR Person Service | acme.apps.per.sample.service.PersonResource | Human Resources | Java | acme | Active | A sample class to demonstrate how serviceable APIs can be developed using the ISG REST framework. |
| QAF REST | acme.apps.find.rep.ws.WFNotifIDerailsWrapper | Application Object Library | Java | acme | Active | Seeded POJP for getting rest services hosted on EBS instance |
| Rest Service Locator | acme.apps.find.rep.ws.service.EbsRestLocator | Application Object Library | Java | acme | Active | APIs to retrieve information about acme EBS REST based Web Services |

520  [Browse]

← 525

500

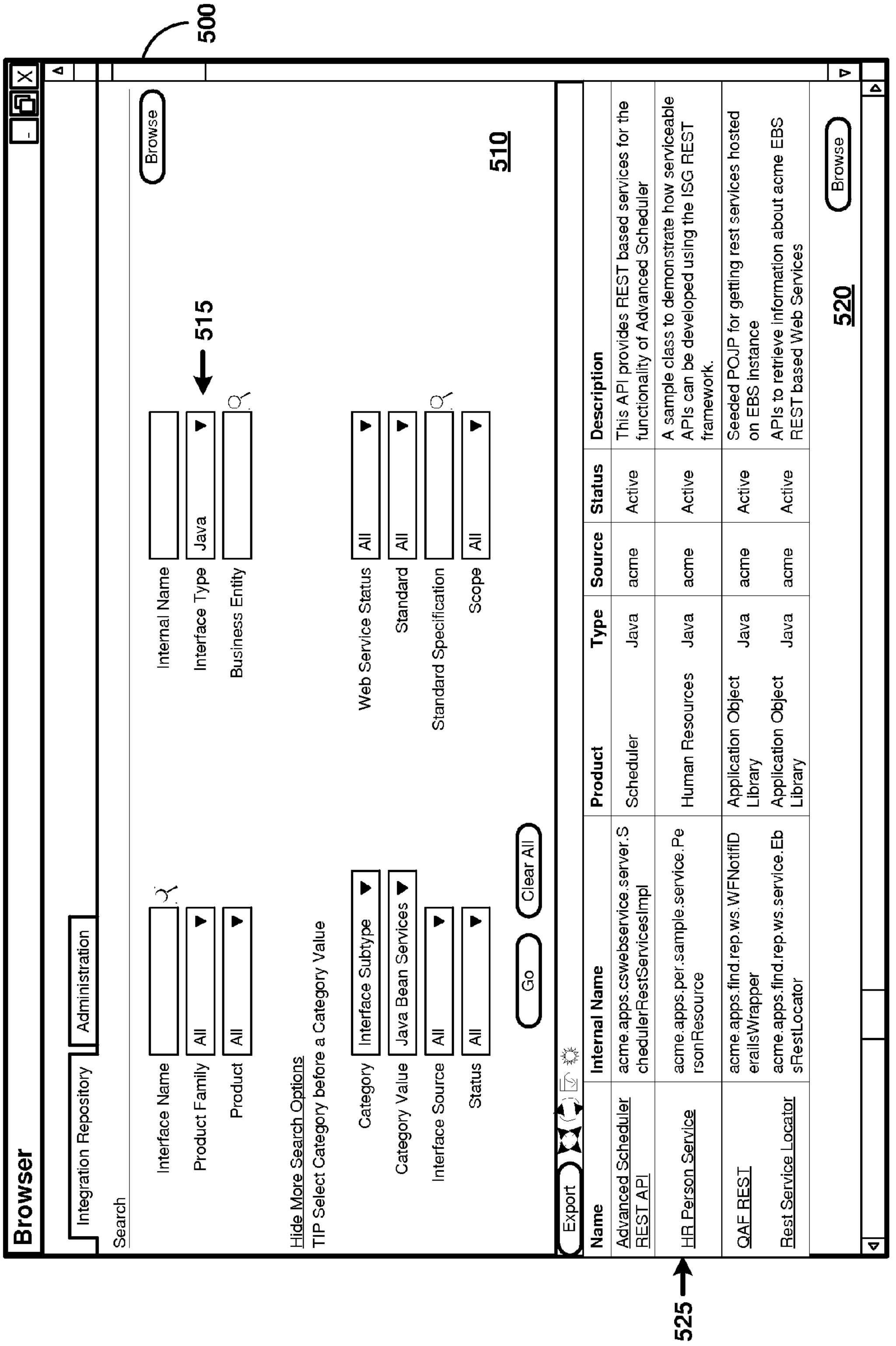

*FIG. 5A*

```
610 → <application name="PersonResource" targetNamespace="http://xmlns.acme.com/apps/per/soaprovider/pojo/personresource/" ...>
620     <grammars>
          <include href="http://slc04qvi.us.acme.com:8000/webservices/rest/PersonService/?XSD=getallreports_get.xsd" … />
          <include href="http://slc04qvi.us.acme.com:8000/webservices/rest/PersonService/?XSD=getpersoninfo_post.xsd" … />
          ...
        </grammars>
630     <resources base="http://slc04qvi.us.acme.com:8000/webservices/rest/PersonService/">
          <resource path="getAllReports/">
            …
          </resource>
640       <resource path="getPersonInfo/{personId}/">
            <param name="personId" style="template" required="true" type="xsd:int"/>
            <method id="getPersonInfo" name="GET">  ← 645
              <request>
                <param name="ctx_responsibility" type="xsd:string" style="query" required="false"/>
                <param name="ctx_respapplication" type="xsd:string" style="query" required="false"/>
                ...
              </request>
              <response>
                <representation mediaType="application/xml" type="tns5:getPersonInfo_Output"/>
                <representation mediaType="application/json" type="tns5:getPersonInfo_Output"/>
              </response>
            </method>
          </resource>
          <resource path="getPersonInfo/">
            <method id="getPersonInfo" name="POST">  ← 655
              <request>
                <representation mediaType="application/xml" type="tns5:getPersonInfo_Input"/>
                <representation mediaType="application/json" type="tns5:getPersonInfo_Input"/>
              </request>
              <response>
                …
              </response>
            </method>
          </resource>
          <resource path="updatePersonInfo/">
            ...
          </resource>
        </resources>
      </application>
```

*FIG. 6*

PROVIDING ACCESS VIA HYPERTEXT TRANSFER PROTOCOL (HTTP) REQUEST METHODS TO SERVICES IMPLEMENTED BY STATELESS OBJECTS

PRIORITY CLAIM

The present disclosure claims priority from U.S. Provisional Patent Application entitled, "PROVIDING ACCESS VIA HYPERTEXT TRANSFER PROTOCOL REQUEST METHODS TO SERVICES IMPLEMENTED BY STATELESS OBJECTS", Ser. No. 62/054,401, Filed: 24 Sep. 2014, which is incorporated in its entirety herewith to the extent not inconsistent with the disclosure herein.

BACKGROUND

Technical Field

The present disclosure relates to application servers, and more specifically to providing access via Hypertext Transfer Protocol (HTTP) request methods to services implemented by stateless objects.

Related Art

Objects are often used as programming language constructs for implementing related services, as is well known in the relevant arts. A service is implemented to process requests and to generate corresponding results, which form the basis for responses to the requests. Objects are deployed on application servers, thereby enabling users to access the services from client systems.

Some objects are implemented as stateless objects, implying that the object, once initialized, does not maintain internal state information generated while processing one request, for the purpose of processing a subsequent request. Even if such state information is maintained for other purposes (e.g., log management), the maintained state information is not used for processing of the subsequent request. JavaBeans and Enterprise Java Beans (EJB) are example technologies which permit deployment of stateless objects for processing requests.

HTTP (Hypertext Transfer Protocol) packets are commonly generated from web browsers executing on client systems, while users at client systems seek to interact with application servers deployed with various objects. Each HTTP packet contains a request method (hereafter referred to as 'HTTP verb') identified by a corresponding pre-defined keyword (GET, POST). The keywords are intended to indicate (to the application server) the manner in which the corresponding packets are to be processed.

Access to services may be tied to specific HTTP verbs contained in the packets. For example, in an application server supporting REST (representational state transfer) architecture, a data retrieval service is tied to the GET HTTP verb, while an update service is tied to the POST HTTP verb, as is well known in the relevant arts. Additional details on REST architecture is provided in the document entitled "Architectural Styles and the Design of Network-based Software Architectures" by Roy Thomas Fielding, available from University of California at Irvine, School of Information and Computer Sciences.

Aspects of the present disclosure relate to improvements for providing access via HTTP verbs to services implemented by stateless objects.

BRIEF DESCRIPTION OF THE DRAWINGS

Example embodiments of the present disclosure are described with reference to the accompanying drawings briefly described below.

FIG. 4A depicts portions of a stateless object according to a programming language in one embodiment.

FIG. 4B depicts a portion of a metadata used for the deployment of stateless beans in one embodiment.

FIG. 4C depicts a portion of a configuration used for the deployment of stateless beans in one embodiment.

FIG. 5A depicts a user interface that enables an administrator to search for stateless objects available (loaded or deployed) in server system in one embodiment.

FIG. 6 depicts a portion of a WADL (Web Application Description Language) file specifying the details of the services provided by a server system in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
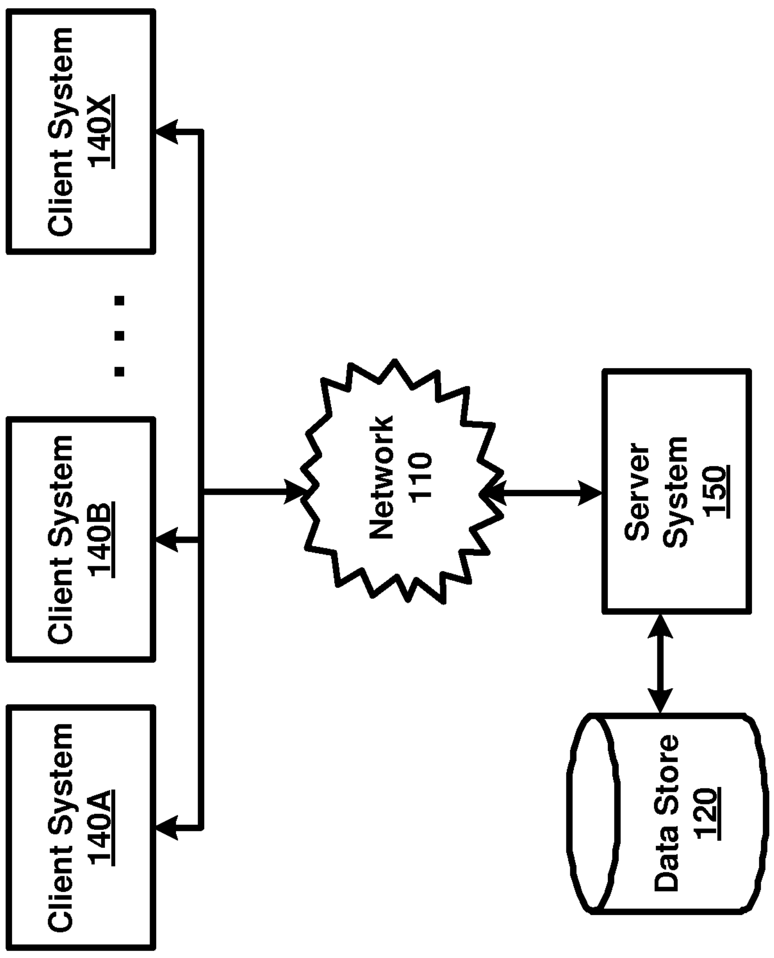
FIG. 1 is a block diagram illustrating an example environment in which several aspects of the present disclosure can be implemented.

An aspect of the present disclosure provides access via HTTP verbs to services implemented by stateless objects. In one embodiment, the list of services implemented by a stateless object deployed on an application server is displayed to a user/administrator. Upon receiving (from the user/administrator) an input data indicating selection of some of the services (from the displayed list), only the selected service are provided access via a corresponding HTTP verb. In other words, a first service that is included in the selection is provided access via a HTTP verb, while a second service not included in the selection is not made accessible via HTTP verbs.

Thus, a user/administrator is facilitated to provide access via HTTP verbs to only services of interest among those implemented by a stateless object at or after the deployment of the stateless object.

In one embodiment, a metadata associated with the stateless object that is received from a developer, indicates that the (above noted) second service would be accessible upon deployment (of the stateless object). The input data (noted above) is received from an administrator prior to the deployment, with the input data indicating that the second service is not included in the selection. Accordingly, the administrator is facilitated to deny access to the second service.

According to another aspect of the present disclosure, the list of services are displayed along a first dimension and a set of HTTP verbs are displayed along a second dimension, with the selection of a cell at the intersection of a service along the first dimension and a HTTP verb along the second dimension indicating that the service is to be provided access via the HTTP verb. An administrator accordingly denies access to the second service (noted above) by not selecting any of the cells corresponding to the second service.

According to one more aspect of the present disclosure, in response to receiving (from an user/administrator), a second input data indicating that a first service is to be accessible via a second HTTP verb (in addition to a first HTTP verb), the first service is provided access via both of the first HTTP verb and the second HTTP verb. In one embodiment, the first HTTP verb is the GET HTTP verb, while the second HTTP verb is the POST HTTP verb. A WADL (Web Application Description Language) description for the first service accordingly indicates that the first service is accessible via both of the first/GET HTTP verb and the second/POST HTTP verb.

According to yet another aspect of the present disclosure, a service framework contained in an application server (on which the stateless objects are deployed) first identifies the corresponding first service mapped to a first request and accordingly invokes the identified first service to generate a first result. Upon receiving the first result containing multiple data sets, the service framework stores the received data sets in a cache and sends a first data set (containing none or any number of data items) as a first response to the first request. Upon receiving a subsequent request for the data sets, the service framework retrieves a second data set from the cache and sends the second data set as a subsequent response to the subsequent request, without requiring the first service to be invoked again.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present disclosure can be implemented. The block diagram is shown containing network 110, data store 120, client systems 140A-140X and server system 150.

Merely for illustration, only representative number/type of systems is shown in FIG. 1. Many environments often contain many more systems, both in number and type, depending on the purpose for which the environment is designed. Each block of FIG. 1 is described below in further detail.

Network 110 provides connectivity between client systems 140A-140X and server system 150, and may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

An IP packet is said to be directed to a target system when the destination IP address of the packet is set to the IP address of the target system, such that the packet is eventually delivered to the target system by network 110. When the packet contains content such as port numbers, which specifies the destination application, the packet may be said to be directed to such application as well. The destination system may be required to keep the corresponding port numbers available/open, and process the packets with the corresponding destination ports. Network 110 may be implemented using any combination of wire-based or wireless mediums.

Data store 120 represents a non-volatile (persistent) storage facilitating storage and retrieval of a collection of data (such as the stateless objects, metadata, etc.) by server system 150. Data store 120 may be implemented as a database server using relational database technologies and accordingly provide storage and retrieval of data using structured queries such as SQL (Structured Query Language). Alternatively, data store 120 may be implemented as a file server providing storage and retrieval of data in the form of files organized as one or more directories, as is well known in the relevant arts.

Each of client systems 140A-140X represents a system such as a personal computer, workstation, mobile station, mobile phones, computing tablets, etc., used by users to generate and send client requests directed to server system 150. The requests may be generated using appropriate user interfaces (e.g., web pages provided by an application executing in a server system, a native user interface provided by a portion of the application downloaded from the server system, etc). In general, a user (using one of client systems 140A-140X) sends requests for performing desired tasks to server system 150 and receives corresponding responses containing the results of performance of the requested tasks.

A client system may be used by a developer to deploy various services on server system 150, or by an administrator to configure access to the various services deployed on server system 150 (according to several aspects of the present disclosure). A client system (for example, 140X) may also be used by an end user to access the various services provided by server system 150. In such as scenario, a client application (such as a web browser) generates and sends client requests for accessing desired services to server system 150 and receives corresponding responses containing the results of performance of the requested services from server system 150.

As noted in the Background Section, each client request may be sent in the form of a corresponding (one or more) HTTP packets associated with a corresponding URL (uniform resource locator). The URL indicates the specific resource to be accessed, while an HTTP verb contained in the HTTP packets (a client request) indicates the manner of processing of the packet (i.e., accessing of the specific resource).

Server system 150 represents a server, such as a web/application server, that provides access to services to one of client systems 140A-140X. The services are provided by stateless objects deployed on server system 150. In one embodiment, server system 150 is implemented to support REST architecture. Accordingly, the access to a service (as indicated by the URL) is tied to the specific HTTP verb contained in each of the client requests.

Accordingly, in response to a client request received from an end user using one of client systems 140A-140X, server system 150 identifies a corresponding deployed service (based on the URL and a metadata that maps URLs to services), invokes the identified service to generate a result, and then sends (to the requesting client system) a response to the client request based on the generated result. In some embodiments, the response may be accompanied by specific user interfaces (e.g., web pages) for displaying the results to the requesting end user.

Furthermore, server system 150 also facilitates developers and administrators (using client systems 140A-140X) to deploy and configure the services respectively. It may be appreciated that server system 150 may use data stored internally (for example, in a non-volatile storage/hard disk within the server system), external data (for example, data stored in data store 120) and/or data received from external sources (e.g., from the user) in providing access to (and in the performance of) the services.

It may be desirable that the access to services implemented by stateless beans be made more flexible. For example, in one approach, a developer is required to specify the accessible services as part of the instructions forming the stateless objects. Accordingly, any change to the accessibility of the services necessitates the developer to modify the instructions, re-compile, and re-test the stateless object and to re-deploy (in server system 150) the modified stateless object.

Furthermore, it may be desirable security issues with certain HTTP verbs be overcome. For example, when using the GET HTTP verb, the parameter information is included as a query string in the URL (for example, "/getPersonData?ssn=123456", wherein "ssn=123456" is the query string indicating the parameter information). Since URLs are not encrypted and server systems/intermediate systems (e.g., in network 110) are designed to log the URLs (including the query strings), sensitive information and/or personally identifiable information of the user (such as the social security number in the above example) may be made public based on such logged information.

Server system 150, extended according to several aspects of the present disclosure, provides access via HTTP verbs to services implemented by stateless objects while overcoming some of the above noted drawbacks. The manner in which server system 150 is extended is described below with examples.

3. Providing Access Via HTTP Verbs

Figure 2:
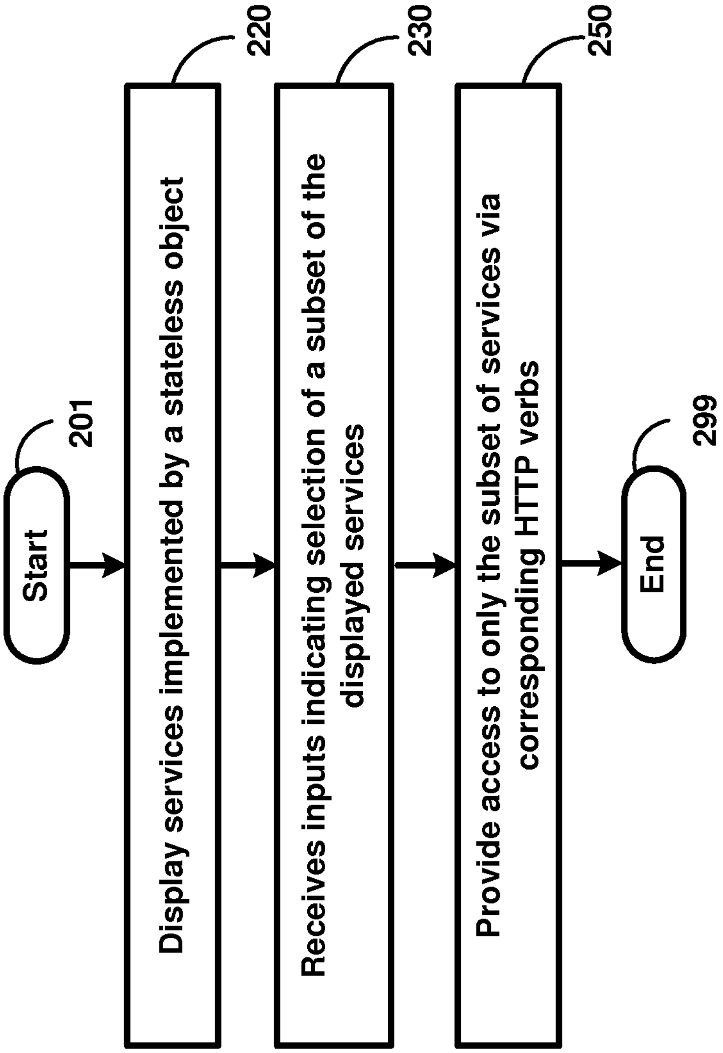
FIG. 2 is a flow chart illustrating the manner in which access via HTTP verbs is provided to services implemented by stateless objects according to an aspect of the present disclosure.

FIG. 2 is a flow chart illustrating the manner in which access via HTTP verbs is provided to services implemented by stateless objects according to an aspect of the present disclosure. The flowchart is described with respect to FIG. 1, in particular, server system 150 merely for illustration. However, many of the features can be implemented in other environments (and using potentially other types of systems/servers) also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 220.

In step 220, server system 150 displays services implemented by a stateless object. As noted above, the stateless object after being initialized processes various access requests (received from end users) without using any internal state information (generated during the processing of prior requests). The specific services implemented by the stateless object may be specified by the developer as a metadata associated with the instructions forming the stateless object, with server system 150 then determining the services by inspecting the metadata/instructions. The services may be displayed to an administrator at a client system (for example, 140A).

In step 230, server system 150 receives inputs (from the administrator) indicating selection of a subset of (displayed) services. The inputs represent the specific ones of the services, the administrator desires to make accessible to various end users at corresponding client systems. The administrator may also tie the access of each selected service to specific HTTP verbs (for example, verbs in addition to those commonly used to access the service as per the REST architecture).

In step 250, server system 150 provides access to only the (selected) subset of services via corresponding HTTP verbs (as specified by the REST architecture or by the administrator). The flow chart ends in step 299.

By not including specific services in the subset, the administrator is provided the ability to deny access to the specific services (among those sent for display in step 220) via HTTP verbs. By tying accessing of services to more secure HTTP verbs (such as POST), the administrator is enabled to provide options that are more secure, and thereby overcome security issues associated with the commonly used HTTP verbs (such as GET).

It may be appreciated that such capabilities can be provided to administrators at or after the deployment of the stateless objects. This is in contrast to a scenario in which a developer specifies the accessible services as part of the instructions forming the stateless objects. Accordingly, providing access via HTTP verbs to only services of interest among those implemented by a stateless object is made more flexible for administrators.

The manner in which server system 150 may provide the access via HTTP verbs to services according to FIG. 2 is illustrated below with examples.

4. Illustrative Example

FIGS. 3, 4A-4B, 5A-5D and 6 together illustrate the manner in which access via HTTP verbs to services implemented by stateless objects is provided in one embodiment. Each of the Figures is described in detail below.

Figure 3:
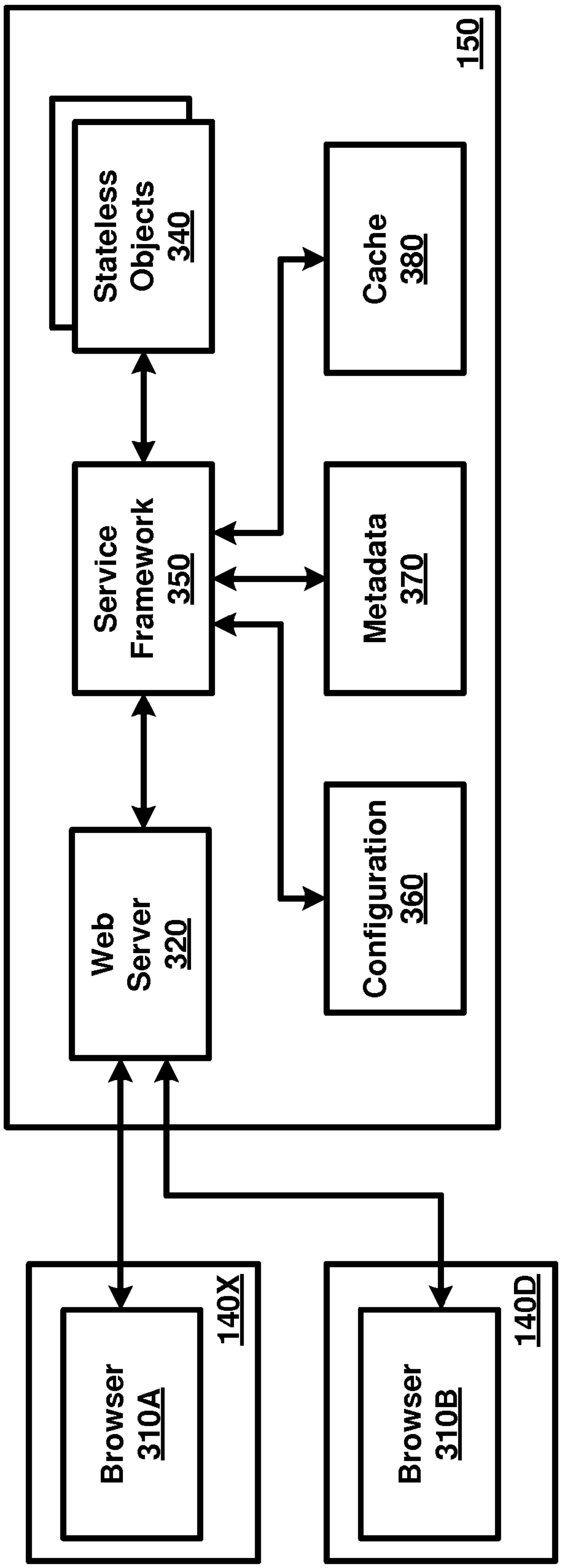
FIG. 3 depicts the manner in which a server system is implemented according to several aspects of the present disclosure.

FIG. 3 depicts the manner in which a server system (150) is implemented according to several aspects of the present disclosure. In particular, the interactions between an end user using a client system (assumed to be 140X) and server system 150 and that between an administrator using another client system (assumed to be 140D) and server system 150 are described in detail below.

Browser 310A represents an application executing in client system 140X, which sends HTTP packets while an end user using client system 140X seeks to interact with server system 150. As noted above, the HTTP packets are sent associated with a URL as part of a client request to server system 150.

Each client request also specifies a HTTP verb indicating the manner of processing/accessing the resource (indicated by the URL). Examples of such browsers are Internet Explorer™ available from Microsoft Corporation, Chrome™ from Google Corporation, etc. Browser 310B represents another instance of the same/different browser application executing in client system 140D, which sends HTTP packets (similar to browser 310A) while an administrator/developer seeks to interact with server system 150.

Web server 320 represents an application that is designed to deliver web content to requesting client systems. In general, web server 320 upon receiving a client request (from one of browsers 310A-310B), determines the specific web content matching the request (based on the URL), retrieves the determined content and then sends the specific web content as a response to the request. Examples of such web content are HTML (hypertext markup language) documents, images, style sheets, scripts, etc.

When the client request indicates a dynamic content (which needs to be created), web server 320 forwards the request to one or more service providers (such as service framework 350) for creating the content, receives the newly created content from the service provider and then sends the received content to the requesting client system (in particular, to browsers 310A-310B). In one embodiment, web server 320 is designed to forward any REST based service/client requests to service framework 350.

Service framework 350 represents an application that provides access to various services implemented by stateless objects 340. In particular, service framework 350 implements REST architecture, whereby the services are provided access based on the HTTP verbs specified in the client requests. In one embodiment, the GET HTTP verb is tied to data retrieval services, the POST HTTP verb is tied to data update services, the DELETE HTTP verb is tied to data deletion services, and the PUT HTTP verb is tied to data insertion services. An example of such a REST based service framework is Integrated SOA Gateway (ISG) REST Service Provider available from Oracle Corporation™, 500 Oracle Parkway, M/S5OP7, Redwood Shores, Calif., USA 94055.

5. Stateless Objects

Each of stateless objects 340 represents a corresponding set of related services implemented according to a programming language (such as Java™). In one embodiment, each stateless object is a JavaBean™ object containing getter methods (for retrieving data) and setter methods (for inserting or updating data). The manner in which a stateless object may be implemented is described in detail below.

FIG. 4A depicts portions of a stateless object (JavaBean) implemented according to a programming language (Java) in one embodiment. The JavaBean is shown as being named "PersonResource" (the class name in data portion 405), and containing the methods "getDirectReports", "getPersonInfo", and "updatePersonInfo" (data portions 410, 420 and 430 respectively). Each of the methods represents a corresponding service implemented by the JavaBean. The actual instructions according to Java programming language contained within each method (and which actually implement the service) are not shown in the Figure, for ease of understanding.

The JavaDoc™ like comments "/** . . . */" before each of the class name and the method names specify corresponding metadata, based on which the corresponding services are to be provided access. The metadata of data portions 405, 410, 420 and 430 is shown having various fields (the words/phrases starting with @) associated with corresponding values (the text following and provided on the same line with the field). The few lines at the beginning (without @ symbol) provide a description of the stateless object/service. The metadata indicates the manner in which the corresponding class/method is to be provided access to external systems (such as client systems 140A-140X).

For example, the value (GET or POST) associated with the field "@rep:httpverb" (lines 415, 425 and 435) in the metadata indicates the specific HTTP verb to be tied to the access of the corresponding service. It should be noted that the HTTP verb(s) specified here reflect the preference of a developer of the code, and these verbs can be overridden by an administrator according to an aspect of the present disclosure, as described in below sections.

In addition, the field "@return" specifies a description of the value returned by the service, the field "@param" indicates a name (such as "personId" in line 421) and description ("person identifier" in line 421) of a parameter of the service, while the field "@rep:paramInfo" specifies the details of the parameter "personId" such as that the parameter is required (as indicated by the text "@rep:required"), etc. The field "@rep:displayname" (in lines 414, 424 and 434) specifies a respective name that is to be displayed for the corresponding service. For example, line 414 indicates that the display name of the service is the same as the name of the method, that is, "getDirectReports".

Referring again to FIG. 3, a developer after developing the stateless object of FIG. 4A may use one of client systems 140A-140X to load (and thereafter deploy) the stateless object in server system 150. The loading may be performed using appropriate user interfaces (not shown) provided by service framework 350. In response to a request for loading a stateless object, service framework 350 may store the loaded object (with or without compilation) as part of stateless objects 340, extract the metadata (in the JavaDoc like comments) from the instructions and store them as part of metadata 370.

Broadly, metadata 370 indicates the manner (name, HTTP verb, scope, etc.) according to which each of the services/methods of the stateless objects is to be provided access to end users. The manner in which metadata (370) may be maintained is described below with examples.

6. Metadata

FIG. 4B depicts a portion of a metadata (370) used for the deployment of stateless beans in one embodiment. For illustration, it is assumed that the metadata (370) is maintained in the form of tables (450 and 460) on a non-volatile storage (e.g., a hard disk) in server system 150. However, in an alternative embodiment, the metadata may be stored external to server system 150, for example, in the form of one or more tables (such as 450 and 460) in a database in data store 120 (implemented as a database server). The metadata may also be maintained using other data structures (such as trees, associative arrays, etc.) and/or in any other format such as XML (Extensible Markup Language), as will be apparent to one skilled in the relevant arts by reading the disclosure herein.

Table 450 specifies the details of the stateless objects (340) loaded in server system 150. Column "Display Name" indicates a name of the stateless object (the value of the "@rep:displayname" field in FIG. 4A), column "Internal Name" indicates the name of a class (including the package name) corresponding to the stateless object, column "Product" indicates the product in which the stateless object is implemented (determined based on the value of the "@rep:product" field), column "Type" indicates the programming language used to implement the class, column "Source" indicates the provider of the class, column "Status" indicates the status of the stateless object (with the value "Active" indicating that the stateless object is ready to be deployed), and column "Description" indicates a description of the stateless object (the lines at the beginning of each JavaDoc like comments in FIG. 4A).

Each of the rows of table 450 specifies the details of a corresponding stateless object loaded in server system 150. In particular, row 455 specifies the details of the stateless object shown in FIG. 4A such as the display name "HR Person Service" (the value of the "@rep:displayname" field in data portion 405), the internal name "acme.apps.per.sample.service.PersonResource" (the concatenation of the package name and the class name), the product "HR Resource" (based on the value "PER" for the "@rep:product" field in data portion 405), the type "Java" (the programming languages of the stateless object of FIG. 4A), the source "acme" (the provider as indicated by the first portion of the package name), the status "Active" and a description (the lines at the beginning of data portion 405). Similarly, the other rows specify the details of corresponding stateless objects that are loaded in server system 150.

Table 460 specifies the details of the services provided by the stateless objects (340) in server system 150. For illustration, only the services provided by the stateless object "HR Person Service" (in row 455 of table 450) are shown in table 460. Though not shown, table 460 typically includes the services provided by the other stateless objects as well, with the services and corresponding stateless objects associated with each other, using primary key/foreign key techniques, as is well known in the relevant arts.

Columns "Display Name", "Status" and "Description" in table 460 are similar to correspondingly named columns in table 450, except that the values in table 460 are indicated for the service (instead of the stateless object). Column "Internal Name" indicates the name of the method corresponding to the service, column "HTTP verb" indicates the HTTP verb to which access to the service is ties (the value of the "@rep:httpverb" field in FIG. 4A), and column "Scope" indicates scope of the service (the value of the "@rep:scope" field).

Each of the rows of table 460 specifies the details of a corresponding service. In particular, row 465 specifies the details of the service shown in data portion 420 of FIG. 4A such as the display name "getPersonInfo" (the value of the "@rep:displayname" field in data portion 420), the internal name "getPersonInfo" (the method name), the HTTP verb "Get" (the value of the "@rep:httpverb" field in data portion 420), the scope "Public" (the value of the "@rep:scope" field in data portion 420), the status "Active" and a description (the lines at the beginning of data portion 420). Similarly, the other rows specify the details of corresponding services that are provided by the stateless objects (340) in server system 150.

Thus, service framework 350 of FIG. 3 inspects the instructions/comments constituting each stateless object, identifies the metadata specified by the developer in the instructions/comments, and stores the identified metadata as shown in tables 450 and 460. Service framework 350 also maintains configuration information (360), as described below with examples.

7. Configuration

Referring again to FIG. 3, configuration 360 represents data that controls the operation of service framework 350. In particular, configuration 360 specifies the URLs at which the stateless beans are deployed, the specific timeout value after which a thread (of execution) processing a request is to be aborted and a retry message is to be sent as a response to the request (thereby enforcing a deterministic response time), the minimum and maximum number of threads/requests that can be executed/processed in parallel (throttling mechanism for requests), and also indicate whether the request processing is to be logged (for monitoring and/or auditing of requests). The manner in which such configuration may be specified is described in detail below.

FIG. 4C depicts a portion of a configuration (360) used for the deployment of stateless beans in one embodiment. The configuration is in the form of a properties file containing lines, with each line assigning a user desired value (such as http://slc06uje.us.acme.com:8001, "FILE", 5, etc.) to a corresponding parameter (such as ISG_SOA_EXTERNAL_URL, ISG_MAX_REST_THREADS, etc).

In particular, the value "http://slc04qvi.us.acme.com:8001" for the parameter ISG_EBS_EXTERNAL_URL (in line 471) indicates the URL at which the stateless beans are to be deployed/and accordingly accessible from client systems 140A-140X. The values "TRUE" and "FILE" for the respective parameters ISG_GLOBAL_LOG and ISG_LOGGER (in lines 473 and 474) indicates that the client requests are to be logged to a file. The value 5 for the parameters ISG_MIN_REST_THREADS (in line 477) indicates the minimum number of threads to be spawned at system (150) startup for processing client requests, while the value 20 for the parameter ISG_MAX_REST_THREADS (in line 478) indicates the maximum number of concurrent threads that are permissible at any time instance. The value 3000 for the parameter ISG_REST_THREAD_EXEC_TIMEOUT (in line 479) indicates the timeout duration (in milliseconds), that is, the duration for which server system 150 will wait for a client request to be processed. If the processing of the request take more time than the timeout, server system 150 will abort the thread, and send a error response to the client request.

Referring again to FIG. 3, service framework 350 loads the stateless objects 340 in server system 150 such that the stateless objects 340 are ready to be deployed (that is, made available for access) according to configuration 360 and metadata 370. The manner in which the services implemented by stateless objects 340 are deployed is described below with examples.

8. Deploying Services

FIGS. 5A-5D depicts various user interfaces that may be provided for deployment of services in a server system (150) in one embodiment. Display area 500 (of FIGS. 5A-5D) depicts a portion of a user interface provided on a display unit (not shown in FIG. 1) associated with one of client systems 140A-140X (assumed to be 140D for illustration). In one embodiment, display area 500 corresponds to browser 310B displaying respective web pages provided by server system 150. The web pages are provided in response to an administrator sending appropriate requests (for example, by specifying corresponding URLs, not shown) using browser 310B in client system 140D.

FIG. 5A depicts a user interface that enables an administrator to search for stateless objects available (loaded or deployed) in server system (150) in one embodiment. Display area 510 enables the administrator to search for stateless objects (maintained in table 450) based on any desired criteria, while display area 520 displays a list of stateless objects matching the user specified criteria. In particular, display area 510 indicates that the administrator is performing a search for Interface types (that is, Type column in table 450) having the value "Java" (display area 515), and accordingly the list of stateless objects shown in display area 520 contains all the stateless objects/rows of table 450.

It may be observed that the stateless object "HR Person Service" of FIG. 4A (and row 455) is shown as item 525 in the list of display area 520. A user/administrator may click/select the stateless object to view the services provided by the selected stateless object. The description is continued assuming that the user/administrator has selected item 525 in display area 520 to view the services provided by the stateless object "HR Person Service". The manner in which the services of a selected stateless object may be provided to an administrator is described below with examples.

Figure 5B:
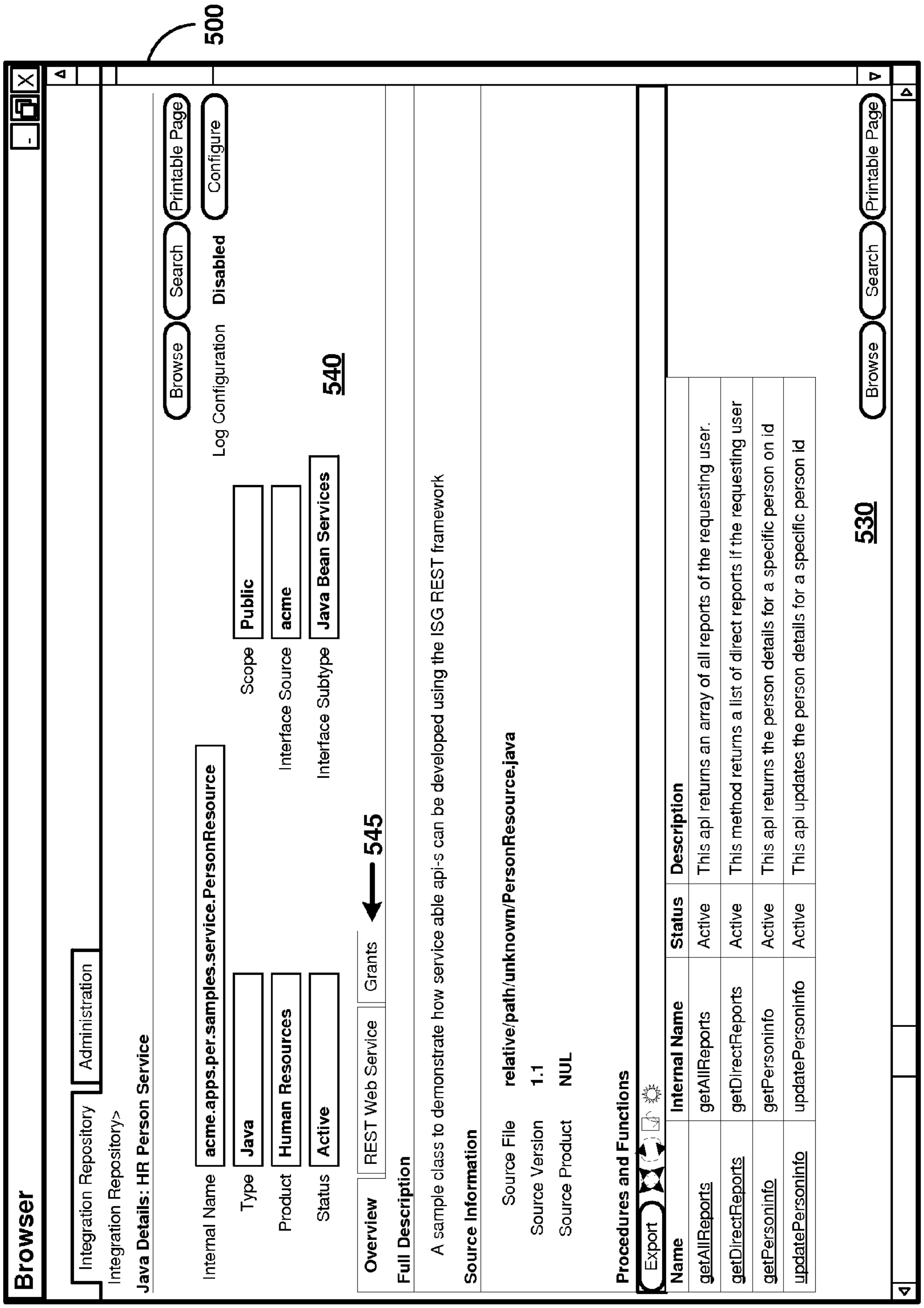
FIG. 5B depicts a user interface that enables an administrator to view the services provided by a selected stateless object in one embodiment.

FIG. 5B depicts a user interface that enables an administrator to view the services provided by a selected stateless object in one embodiment. In particular, display area 540 displays the details such as the internal name, type, product, source, status, etc. of the selected stateless object "HR Person Service". It may be appreciated that the details shown in display area 540 corresponds to the data in row 455 of FIG. 4B.

Display area 530 displays a list of services provided by the stateless object "HR Person Service". The list of services shown in display area 530 corresponds to the rows of table 460 in FIG. 4B. As noted above, display areas 540 and 530 may be provided in response to the user/administrator selecting the "HR Person Service" (item 525) in display area 520.

Display area 545 depicts a set of tabs that may be selected by the user/administrator to perform corresponding actions. For example, the administrator may select "Overview" tab to view the details/services of the selected stateless object, and select "REST Web Service" to deploy/undeploy the desired services of the selected stateless object. It may be observed that the "Overview" table is shown selected in FIG. 5B. The description is continued assuming that the user/administrator selects the "REST Web Service" tab in display area 545 to deploy some of the services.

Figure 5C:
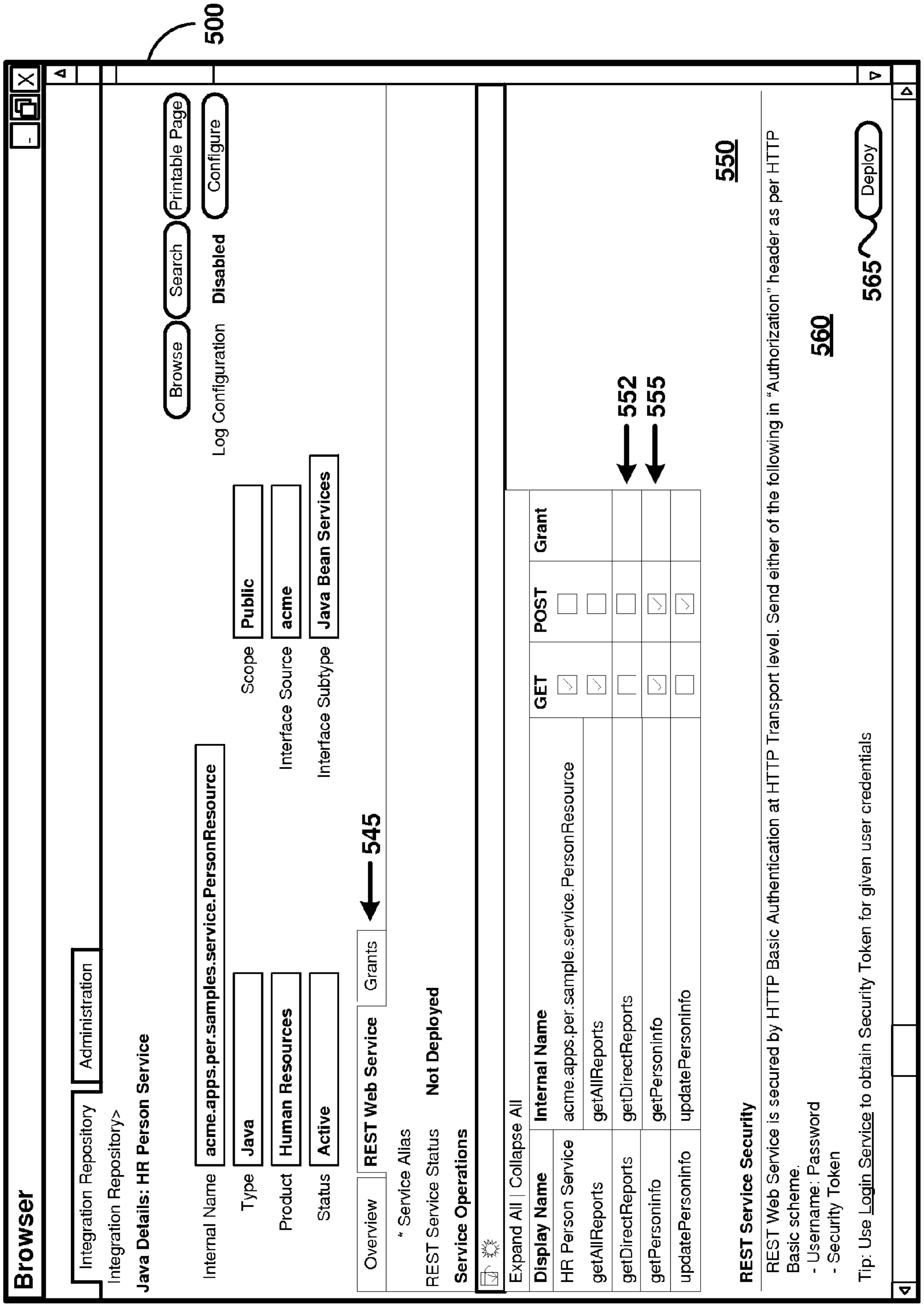
FIG. 5C depicts a user interface that enables an administrator to select and deploy only a subset of the services implemented by a stateless object in one embodiment.

FIG. 5C depicts a user interface that enables an administrator to select and deploy only a subset of the services implemented by a stateless object in one embodiment. Display area 550 may be displayed in response to a user/administrator viewing the user interface of display area 530 and thereafter selecting the "REST Web Service" tab in display area 545. The "REST Web Service" tab is accordingly shown selected in display area 545 of FIG. 5C.

Display area 550 shows a table with the list of the services (rows of table 460) implemented by the selected stateless object "HR Person Service" as rows, and the various available HTTP verbs (such as GET, POST, PUT, DELETE, etc.) as columns. Though shown as a table, in alternative embodiments, any other suitable display interface (for example, a two-dimensional matrix) may be provided to the administrator. In general, the services are displayed along a first dimension, while the HTTP verbs are displayed along a second dimension with the selection (for example, by selecting the checkbox) of a cell at the intersection of a service along the first dimension and a HTTP verb along the second dimension indicating that the service (corresponding to the cell) is to be provided access via the HTTP verb (corresponding to the cell).

Each of cells (at the intersection of a corresponding row and column) in the table/two-dimensional matrix is shown having a checkbox, the selection of which indicates that the service represented by the corresponding row is accessible via the HTTP verb represented by the corresponding column Thus, the selection of the checkboxes under the GET column indicates that the corresponding services are accessible via the GET HTTP verb, while the selection of the checkboxes under the POST column indicates that the corresponding services are accessible via the POST HTTP verb.

It may be appreciated that an administrator may deselect/uncheck all the checkboxes in a row to indicate that the corresponding service is denied/not accessible to end users (for example, when accessing the service using browser 310A in client system 140X), while the selection of a single checkbox in the row indicates that the service is accessible (via the selected HTTP verb). In particular, the administrator may deny access (by selecting none of the checkboxes) to a specific service, even though the metadata (of FIG. 4A) specified by a developer indicates that the specific service is to be made accessible upon deployment (of the stateless object). For example, in row 552, the cells for all the HTTP verbs displayed as columns are shown to be not selected indicating that the administrator wishes to deny access to the service "getDirectReports".

Furthermore, an administrator may provide an input (for example, by selecting the appropriate checkboxes) indicating that a service is to be made accessible via a second HTTP verb (in addition to a first HTTP verb). For example, in row 555 of FIG. 5C, the administrator is shown selecting the POST HTTP verb in addition to the GET HTTP verb for the service "getPersonInfo", thereby indicating that the service is to made accessible via both the HTTP verbs.

After selecting the desired services and HTTP verbs, the administrator may click/select the "Deploy" button 565 in display area 560 to cause the selected services to be made accessible to end users. The description is continued assuming that the administrator has made the selections (checkboxes in the cells) shown in display area 550, and then clicked/selected button 565.

Figure 5D:
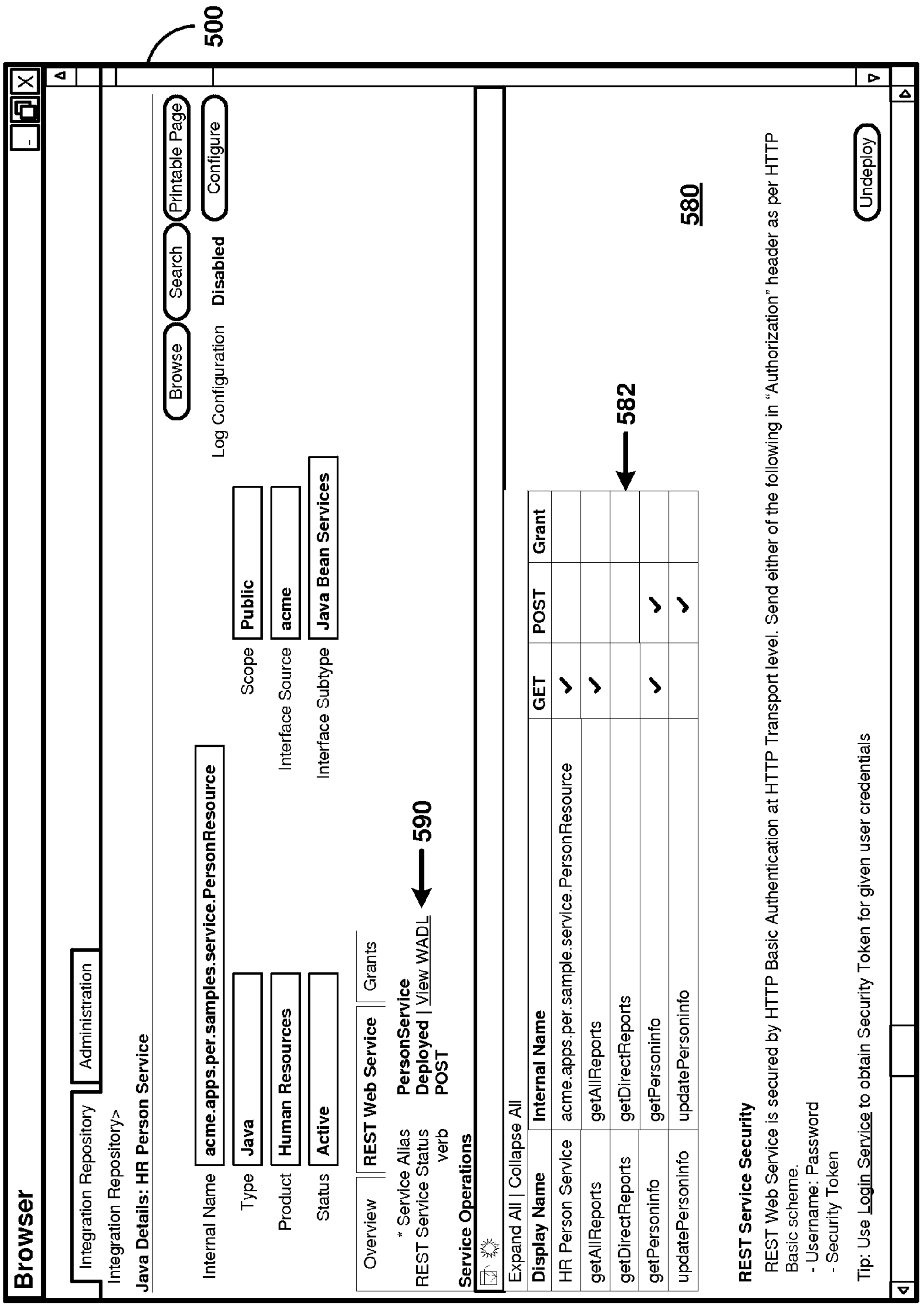
FIG. 5D depicts a user interface indicating the status of deployment of selected services in one embodiment.

FIG. 5D depicts a user interface indicating the status of deployment of selected services in one embodiment. Display area 580 may be displayed in response to an administrator selecting the services and corresponding HTTP verbs in display area 550 and then selecting button 565. It may be observed that only the selected set of service is shown as successfully deployed (indicated by the tick mark).

In particular, display area 580 indicates that the service "getDirectReports" has not been deployed (as indicated by the lack of tick marks in row 582), in view of the administrator not selecting any checkboxes for the service in row 552 of display area 550. Also, display area 580 indicates that the service "getPersonInfo" has been successfully deployed for access via both the GET and POST HTTP verbs, in view of the administrator having selected the checkboxes corresponding to both the HTTP verbs in row 555 of display area 550.

Thus, an administrator is enabled to select and deploy only some of the services implemented by the stateless object "HR Person Service". It may be appreciated that once the stateless objects are loaded/available in server system 150, the administrator may at any time at or after the deployment of the stateless object, change the specific subset of services that are to be made accessible. It should be noted that such change in the accessible services is performed without having to redeploy the code (shown in FIG. 4A), in contrast to existing system such as JAX-RS, Apache CXF where the code is required to be redeployed for changing the accessible services.

It should be noted, that the use of a POST based request instead of a GET based request to retrieve data ensures that the security issues related to the GET HTTP verb are overcome, since the parameter information are included as part of the packet (and accordingly can be encrypted, for example, using SSL communication) when the POST HTTP verb is used.

In one embodiment (not shown), an administrator may remove the selection for the GET HTTP verb while adding a selection for the POST HTTP verb, effectively overriding the GET verb specified by the developer (as part of the metadata) with the POST verb. It should be noted that such overriding is allowed only when the service is initially specified to be accessible via the GET verb (in general, while preserving the semantic integrity of the HTTP verbs as much as possible).

In a scenario that the metadata indicates any other verb (such as PUT or POST), the administrator is not facilitated to override such verbs (for example, by enabling only the checkbox of the verb indicated by the metadata, and disabling all other checkboxes in the row corresponding to the service).

Thus, a user/administrator is facilitated to select and deploy only services of interest in server system 150. The manner in which the deployed services are accessed by end users using HTTP verbs is described below with examples.

9. Accessing Services Using HTTP Verbs

After successful deployment, a client system (such as 140X) can query server system 150 for the services that are provided by server system 150. Server system 150 (and in particular, service framework 350) then provides the details of the services deployed (and accordingly accessible) on server system 150. The manner in which the details of the deployed services may be provided to a client system is described below with examples.

FIG. 6 depicts a portion of a WADL (Web Application Description Language) file specifying the details of the services provided by a server system in one embodiment. More details on WADL is provided in the document entitled "Web Application Description Language", available from W3 Consortium, Mass. Institute of Technology, Cambridge, Mass., U.S. Only sample portions of the WADL file are shown in FIG. 6 for illustration (with Appendix A having more portions corresponding to the deployment shown in FIG. 5D). It may be noted that the same WADL file (of FIG. 6) may be viewed by an administrator by clicking/selecting the "View WADL" link 590 in FIG. 5D.

Data portion 610 indicates that the application name is "PersonResource" and accordingly specifies the details of the deployed services implemented by the stateless bean "PersonResource" (shown in FIG. 4A). Data portion 620 provides links to various schemas corresponding to each of the deployed service, while data portion 630 specifies the details of the manner in which requests and responses are to be sent/received by client systems (such as 140X) for each of the deployed services (referred to as "resources").

Data portion 640 indicates that a resource is available at the URL/path "getPersonInfo/{personId}", where the personId is a parameter that is required and is of type int (that is, integer). The resource is a service/method named "getPersonInfo" whose access is tied to the HTTP verb GET (as indicated by data portion 645). Data portion 640 also specifies the details of the request/response for the specific resource.

It may be observed that only the subset of services selected (and deployed) by the administrator are indicated in the WADL of FIG. 6. In particular, the service "getDirectReports" is absent from the WADL in view of the administrator not selecting/denying access to the service in display area 550 of FIG. 5C. Furthermore, data portion 655 indicates that the same method "getPersonInfo" is also accessible using the HTTP verb POST, in addition to the HTTP verb GET (as indicated by data portion 645).

Referring again to FIG. 3, service framework 350, upon receiving a client request (for example, from 140X) according to the WADL of FIG. 6, first identifies the corresponding service mapped to the request (based on the URL and the HTTP verb) and then invokes the identified service to generate a result. Service framework 350 then forms a response based on the generated result and sends the response to the requesting client system (140X).

For example, upon receiving a client request (from browser 310A) with an URL of the form "getPersonInfo/{personId}", where personId is an integer, service framework 350 identifies that the corresponding service/method "getPersonInfo" of the "PersonResource" class is mapped to the request. Service framework 350 accordingly invokes the method "getPersonInfo" of the "PersonResource" class to generate a result, and then form a response (according to data portion 640 of FIG. 6) based on the generated result. Service framework 350 then sends the response to browser 310A (executing in client system 140X).

According to an aspect of the present disclosure, when the result contains multiple data sets, service framework 350 stores the received data sets in cache 380 and sends a first data set as a response to the request. Upon receiving a subsequent request for the data sets, service framework 350 retrieves a second data set from cache 380 and sends the second subset as a subsequent response to the subsequent request, without requiring the service to be invoked again. Such a feature may be desirable when the client system is a mobile device, which may not be able to handle a large set of data sets in a single response.

For example, in response to a request for the service "getAllReports", the result may include a large number of reports (potentially 100+). Service framework 350 may store the reports in cache 380, and thereafter send a smaller number of reports (for example, 10) as a response to the request. The response may also indicate that additional reports/data sets are available for the request. Upon receiving a subsequent request for the additional reports, service framework 350 forms the response by retrieving and using the reports stored in cache 380. Accordingly, the larger number of reports is facilitated to be accessed by a client system such as a mobile device, noted above.

It should be further appreciated that the features described above can be implemented in various embodiments as a desired combination of one or more of hardware, executable modules, and firmware. The description is continued with respect to an embodiment in which various features are operative when the instructions in the executable modules are executed.

10. Digital Processing System

Figure 7:
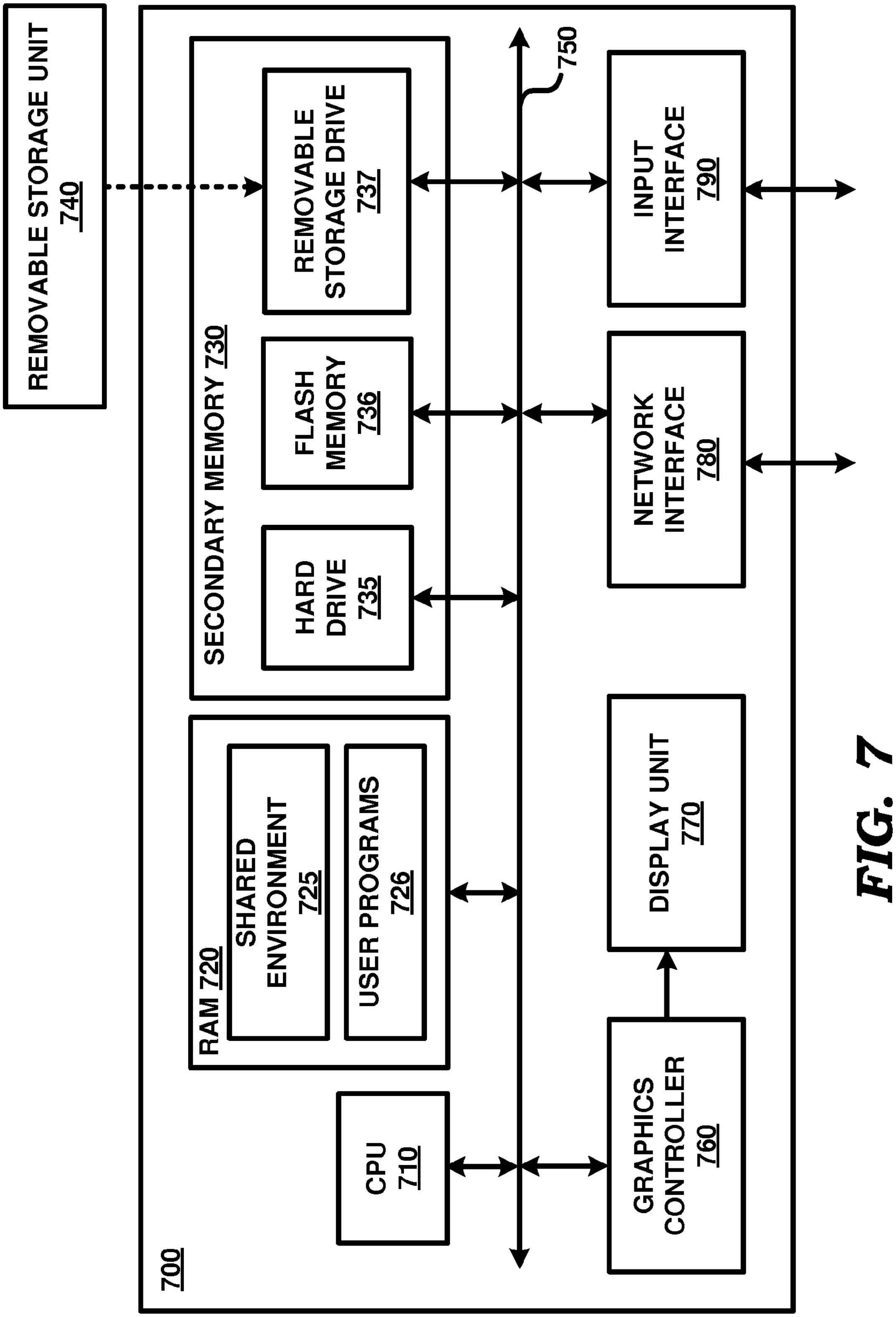
FIG. 7 is a block diagram illustrating the details of a digital processing system in which several aspects of the present disclosure are operative by execution of appropriate software instructions.

FIG. 7 is a block diagram illustrating the details of digital processing system 700 in which several aspects of the present disclosure are operative by execution of appropriate software instructions. Digital processing system 700 corresponds to server system 150.

Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or user programs 726 (such as web servers, database applications, etc.). Shared environment 725 contains utilities shared by user programs, and such shared utilities include operating system, device drivers, virtual machines, flow engines, etc., which provide a (common) run time environment for execution of user programs 726.

Graphics controller 760 generates display signals (e.g., in RGB format) to display unit 770 based on data/instructions received from CPU 710. Display unit 770 contains a display screen to display the images defined by the display signals (such as the portions of the user interface of FIGS. 5A-5D). Input interface 790 may correspond to a keyboard and a pointing device (e.g., touch-pad, mouse) that may be used to provide various inputs (such as to specify the desired inputs, etc. in the user interfaces of FIGS. 5A-5D). Network interface 780 provides connectivity to a network (e.g., using Internet Protocol), and may be used to communicate with other connected systems (such as client systems 140A-140X).

Secondary memory 730 represents a non-transitory medium, which may store the data (for example, portions of data shown in FIGS. 4A-4C and 6) and software instructions (for example, for performing the steps of FIG. 2), to enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Secondary memory 730 may contain hard drive 735, flash memory 736, and removable storage drive 737. Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

Appendix A

```
<?xml version = '1.0' encoding = 'UTF-8'?>
<application name="PersonResource"
targetNamespace="http://xmlns.acme.com/apps/per/soaprovider/pojo/personresource/"
xmlns:tns="http://xmlns.acme.com/apps/per/soaprovider/pojo/personresource/"
xmlns="http://wadl.dev.java.net/2009/02" xmlns:xsd="http://www.w3.org/2001/XMLSchema"
xmlns:tns1="http://xmlns.acme.com/apps/fnd/rest/personservice/getaccrualbalance/"
xmlns:tns2="http://xmlns.acme.com/apps/fnd/rest/personservice/getaccrualbalance__1/"
xmlns:tns3="http://xmlns.acme.com/apps/fnd/rest/personservice/getallreports/"
xmlns:tns4="http://xmlns.acme.com/apps/fnd/rest/personservice/getpersoninfo/"
xmlns:tns5="http://xmlns.acme.com/apps/fnd/rest/personservice/updatepersoninfo/">
 <grammars>
    <include
href="http://slc04qvi.us.acme.com:8000/webservices/rest/PersonService/?XSD=getaccrualbalan
ce_get.xsd" xmlns="http://www.w3.org/2001/XMLSchema"/>
    <include
href="http://slc04qvi.us.acme.com:8000/webservices/rest/PersonService/?XSD=getaccrualbalan
ce__1_get.xsd" xmlns="http://www.w3.org/2001/XMLSchema"/>
    <include
href="http://slc04qvi.us.acme.com:8000/webservices/rest/PersonService/?XSD=getallreports_ge
t.xsd" xmlns="http://www.w3.org/2001/XMLSchema"/>
    <include
href="http://slc04qvi.us.acme.com:8000/webservices/rest/PersonService/?XSD=getpersoninfo_p
ost.xsd" xmlns="http://www.w3.org/2001/XMLSchema"/>
    <include
href="http://slc04qvi.us.acme.com:8000/webservices/rest/PersonService/?XSD=updatepersoninf
o_post.xsd" xmlns="http://www.w3.org/2001/XMLSchema"/>
  <include
href="http://slc04qvi.us.acme.com:8000/webservices/rest/PersonService/?XSD=getpersoninfo_g
et.xsd" xmlns="http://www.w3.org/2001/XMLSchema"/>
  </grammars>
  <resources base="http://slc04qvi.us.acme.com:8000/webservices/rest/PersonService/">
    <resource path="getAccrualBalance/{personId}/">
      <param name="personId" style="template" required="true" type="xsd:int"/>
      <method id="getAccrualBalance" name="GET">
        <request>
          <param name="ctx_responsibility" type="xsd:string" style="query" required="false"/>
          <param name="ctx_respapplication" type="xsd:string" style="query"
required="false"/>
          <param name="ctx_securitygroup" type="xsd:string" style="query" required="false"/>
          <param name="ctx_nlslanguage" type="xsd:string" style="query" required="false"/>
          <param name="ctx_language" type="xsd:string" style="query" required="false"/>
          <param name="ctx_orgid" type="xsd:int" style="query" required="false"/>
          <param name="asonDate" type="null" style="query" required="true"/>
        </request>
        <response>
          <representation mediaType="application/xml"
type="tns1:getAccrualBalance_Output"/>
          <representation mediaType="application/json"
type="tns1:getAccrualBalance_Output"/>
        </response>
```

```
      </method>
    </resource>
    <resource path="getAccrualBalance__1/{personId}/">
      <param name="personId" style="template" required="true" type="xsd:int"/>
      <method id="getAccrualBalance__1" name="GET">
        <request>
          <param name="ctx_responsibility" type="xsd:string" style="query" required="false"/>
          <param name="ctx_respapplication" type="xsd:string" style="query"
required="false"/>
          <param name="ctx_securitygroup" type="xsd:string" style="query" required="false"/>
          <param name="ctx_nlslanguage" type="xsd:string" style="query" required="false"/>
          <param name="ctx_language" type="xsd:string" style="query" required="false"/>
          <param name="ctx_orgid" type="xsd:int" style="query" required="false"/>
        </request>
        <response>
          <representation mediaType="application/xml"
type="tns2:getAccrualBalance__1_Output"/>
          <representation mediaType="application/json"
type="tns2:getAccrualBalance__1_Output"/>
        </response>
      </method>
    </resource>
    <resource path="getAllReports/">
      <method id="getAllReports" name="GET">
        <request>
          <param name="ctx_responsibility" type="xsd:string" style="query" required="false"/>
          <param name="ctx_respapplication" type="xsd:string" style="query"
required="false"/>
          <param name="ctx_securitygroup" type="xsd:string" style="query" required="false"/>
          <param name="ctx_nlslanguage" type="xsd:string" style="query" required="false"/>
          <param name="ctx_language" type="xsd:string" style="query" required="false"/>
          <param name="ctx_orgid" type="xsd:int" style="query" required="false"/>
        </request>
        <response>
          <representation mediaType="application/xml" type="tns3:getAllReports_Output"/>
          <representation mediaType="application/json" type="tns3:getAllReports_Output"/>
        </response>
      </method>
    </resource>
    <resource path="getPersonInfo/{personId}/">
      <param name="personId" style="template" required="true" type="xsd:int"/>
      <method id="getPersonInfo" name="GET">
        <request>
          <param name="ctx_responsibility" type="xsd:string" style="query" required="false"/>
          <param name="ctx_respapplication" type="xsd:string" style="query"
required="false"/>
          <param name="ctx_securitygroup" type="xsd:string" style="query" required="false"/>
          <param name="ctx_nlslanguage" type="xsd:string" style="query" required="false"/>
          <param name="ctx_language" type="xsd:string" style="query" required="false"/>
          <param name="ctx_orgid" type="xsd:int" style="query" required="false"/>
        </request>
        <response>
```

```
        <representation mediaType="application/xml" type="tns4:getPersonInfo_Output"/>
        <representation mediaType="application/json" type="tns4:getPersonInfo_Output"/>
      </response>
    </method>
  </resource>
  <resource path="getPersonInfo/">
    <method id="getPersonInfo" name="POST">
      <request>
        <representation mediaType="application/xml" type="tns4:getPersonInfo_Input"/>
        <representation mediaType="application/json" type="tns4:getPersonInfo_Input"/>
      </request>
      <response>
        <representation mediaType="application/xml" type="tns4:getPersonInfo_Output"/>
        <representation mediaType="application/json" type="tns4:getPersonInfo_Output"/>
      </response>
    </method>
  </resource>
  <resource path="updatePersonInfo/">
    <method id="updatePersonInfo" name="POST">
      <request>
        <representation mediaType="application/xml" type="tns5:updatePersonInfo_Input"/>
        <representation mediaType="application/json" type="tns5:updatePersonInfo_Input"/>
      </request>
      <response>
        <representation mediaType="application/xml"
type="tns5:updatePersonInfo_Output"/>
        <representation mediaType="application/json"
type="tns5:updatePersonInfo_Output"/>
      </response>
    </method>
  </resource>
 </resources>
</application>
```

What is claimed is:

1. A method of providing access to services implemented by stateless objects, said method comprising:

examining a first stateless object to determine a plurality of services implemented by said first stateless object and a specific ones of HTTP (Hypertext Transfer Protocol) verbs via which each of said plurality of services is accessible, wherein each service of said plurality of services is represented by a corresponding method in said first stateless object;

sending for display said plurality of services implemented by said first stateless object, said plurality of services including a first service and a second service;

receiving input data from an administrator indicating selection of a first set of services of said plurality of services, wherein said first set of services includes said first service but does not include said second service; and upon deployment of said first stateless object on an application server, providing access to said first set of services from said application server via corresponding HTTP verb, wherein said first service is provided access via a first HTTP verb and said second service is not accessible via any of said HTTP verbs.

2. The method of claim 1, wherein a metadata associated with said first stateless object received from a developer specifies a corresponding set of HTTP verbs via which each service of said plurality of services is accessible, wherein said metadata indicates that said second service would be accessible via a second set of HTTP verbs upon said deployment, wherein input data is received from an administrator prior to said deployment, said input data specifying no HTTP verbs for said second service to indicate that said second service is not to be included in said first set of services, whereby said administrator is facilitated to deny access to said second service.

3. The method of claim 2, wherein said plurality of services are displayed along a first dimension and a plurality of HTTP verbs are displayed along a second dimension, wherein selection by said administrator of a cell at the intersection of a service along said first dimension and a HTTP verb along said second dimension indicates that the service is to be provided access via the HTTP verb, wherein said administrator denies access to said second service by not selecting any of the cells corresponding to said second service.

4. The method of claim 1, further comprising:

receiving a second input data from said administrator indicating that said first service is to be accessible via a second HTTP verb also, wherein said providing provides access to said first service via both of said first HTTP verb and said second HTTP verb.

5. The method of claim 4, wherein said first HTTP verb and said second HTTP verb are GET HTTP verb and POST HTTP verb respectively.

6. The method of claim 4, wherein a WADL (Web Application Description Language) description for said first service indicates that said first service is accessible via both of said first HTTP verb and said second HTTP verb.

7. The method of claim 1, wherein said application server further comprises a service framework that identifies the corresponding service mapped to each request, invokes the identified service to generate a result, and sends a response to the request based on the result, said method further comprising:

receiving in said service framework, a first result corresponding to a first request for said first service, wherein said first result is obtained by invoking said first service implemented by said first stateless object, said first result containing a plurality of data sets;

storing said plurality of data sets in a cache;

sending a first data set of said plurality of data sets as a first response to said first request;

upon receiving a subsequent request for said plurality of data sets, retrieving a second data set of said plurality of data sets from said cache and sending said second data set as a subsequent response to said subsequent request, without requiring said first service to be invoked again.

8. A non-transitory machine readable medium storing one or more sequences of instructions for enabling a system to provide access to services implemented by stateless objects, wherein execution of said one or more instructions by one or more processors contained in said system enables said system to perform the actions of:

examining a first stateless object to determine a plurality of services implemented by said first stateless object and a specific ones of HTTP (Hypertext Transfer Protocol) verbs via which each of said plurality of services is accessible, wherein each service of said plurality of services is represented by a corresponding method in said first stateless object;

sending for display said plurality of services implemented by said first stateless object, said plurality of services including a first service and a second service;

receiving input data from an administrator indicating selection of a first set of services of said plurality of services, wherein said first set of services includes said first service but does not include said second service; and upon deployment of said first stateless object on an application server, providing access to said first set of services from said application server via corresponding HTTP verb, wherein said first service is provided access via a first HTTP verb and said second service is not accessible via any of said HTTP verbs.

9. The non-transitory machine readable medium of claim 8, wherein a metadata associated with said first stateless object received from a developer specifies a corresponding set of HTTP verbs via which each service of said plurality of services is accessible, wherein said metadata indicates that said second service would be accessible via a second set of HTTP verbs upon said deployment, wherein input data is received from an administrator prior to said deployment, said input data specifying no HTTP verbs for said second service to indicate that said second service is not to be included in said first set of services, whereby said administrator is facilitated to deny access to said second service.

10. The non-transitory machine readable medium of claim 9, wherein said plurality of services are displayed along a first dimension and a plurality of HTTP verbs are displayed along a second dimension, wherein selection by said administrator of a cell at the intersection of a service along said first dimension and a HTTP verb along said second dimension indicates that the service is to be provided access via the HTTP verb, wherein said administrator denies access to said second service by not selecting any of the cells corresponding to said second service.

11. The non-transitory machine readable medium of claim 8, further comprising one or more instructions for:

receiving a second input data indicating that said first service is to be accessible via a second HTTP verb also, wherein said providing provides access to said first service via both of said first HTTP verb and said second HTTP verb.

12. The non-transitory machine readable medium of claim 11, wherein said first HTTP verb and said second HTTP verb are GET HTTP verb and POST HTTP verb respectively.

13. The non-transitory machine readable medium of claim 11, wherein a WADL (Web Application Description Language) description for said first service indicates that said first service is accessible via both of said first HTTP verb and said second HTTP verb.

14. The non-transitory machine readable medium of claim 8, wherein said application server further comprises a service framework that identifies the corresponding service mapped to each request, invokes the identified service to generate a result, and sends a response to the request based on the result, further comprising one or more instructions for:

receiving in said service framework, a first result corresponding to a first request for said first service, wherein said first result is obtained by invoking said first service implemented by said first stateless object, said first result containing a plurality of data sets;

storing said plurality of data sets in a cache;

sending a first data set of said plurality of data sets as a first response to said first request;

upon receiving a subsequent request for said plurality of data sets, retrieving a second data set of said plurality of data sets from said cache and sending said second data set as a subsequent response to said subsequent request, without requiring said first service to be invoked again.

15. A digital processing system comprising:

a processor;

a random access memory (RAM);

a non-transitory machine readable medium to store one or more instructions, which when retrieved into said RAM and executed by said processor causes said digital processing system to provide access to services implemented by stateless objects, said digital processing system performing the actions of:

examining a first stateless object to determine a plurality of services implemented by said first stateless object and a specific ones of HTTP (Hypertext Transfer Protocol) verbs via which each of said plurality of services is accessible, wherein each service of said plurality of services is represented by a corresponding method in said first stateless object;

sending for display said plurality of services implemented by said first stateless object, said plurality of services including a first service and a second service;

receiving input data from an administrator indicating selection of a first set of services of said plurality of services, wherein said first set of services includes said first service but does not include said second service; and upon deployment of said first stateless object on an application server, providing access to said first set of services from said application server via corresponding HTTP verb, wherein said first service is provided access via a first HTTP verb and said second service is not accessible via any of said HTTP verbs.

16. The digital processing system of claim 15, wherein a metadata associated with said first stateless object received from a developer specifies a corresponding set of HTTP verbs via which each service of said plurality of services is accessible, wherein said metadata indicates that said second service would be accessible via a second set of HTTP verbs upon said deployment, wherein input data is received from an administrator prior to said deployment, said input data specifying no HTTP verbs for said second service to indicate that said second service is not to be included in said first set of services, whereby said administrator is facilitated to deny access to said second service.

17. The digital processing system of claim 16, wherein said plurality of services are displayed along a first dimension and a plurality of HTTP verbs are displayed along a second dimension, wherein selection by said administrator of a cell at the intersection of a service along said first dimension and a HTTP verb along said second dimension indicates that the service is to be provided access via the HTTP verb, wherein said administrator denies access to said second service by not selecting any of the cells corresponding to said second service.

18. The digital processing system of claim 15, further performing the actions of:

receiving a second input data indicating that said first service is to be accessible via a second HTTP verb also, wherein said providing provides access to said first service via both of said first HTTP verb and said second HTTP verb.

19. The digital processing system of claim 18, wherein said first HTTP verb and said second HTTP verb are GET HTTP verb and POST HTTP verb respectively.

20. The digital processing system of claim 15, wherein said application server further comprises a service framework that identifies the corresponding service mapped to each request, invokes the identified service to generate a result, and sends a response to the request based on the result, said digital processing system further performing the actions of:

receiving in said service framework, a first result corresponding to a first request for said first service, wherein said first result is obtained by invoking said first service implemented by said first stateless object, said first result containing a plurality of data sets;

storing said plurality of data sets in a cache;

sending a first data set of said plurality of data sets as a first response to said first request;

upon receiving a subsequent request for said plurality of data sets, retrieving a second data set of said plurality of data sets from said cache and sending said second data set as a subsequent response to said subsequent request, without requiring said first service to be invoked again.

* * * * *

UNITED STATES PATENT AND TRADEMARK OFFICE
CERTIFICATE OF CORRECTION

PATENT NO. : 9,860,298 B2
APPLICATION NO. : 14/659641
DATED : January 2, 2018
INVENTOR(S) : Ghosh et al.

Page 1 of 1

It is certified that error appears in the above-identified patent and that said Letters Patent is hereby corrected as shown below:

In Column 4, Line 48, delete "as" and insert -- a --, therefor.

In Column 12, Line 1, delete "column" and insert -- column. --, therefor.

Signed and Sealed this
Tenth Day of July, 2018

Andrei Iancu
*Director of the United States Patent and Trademark Office*